United States Patent [19]
Shigemoto

[11] Patent Number: 6,091,586
[45] Date of Patent: Jul. 18, 2000

[54] DISK DRIVING APPARATUS WITH UPPER AND LOWER HEAD ARMS AND A SIMPLE HEAD DETACHING MEANS

[75] Inventor: Tatsuhiko Shigemoto, Kanagawa, Japan

[73] Assignee: Sony Corporation, Tokyo, Japan

[21] Appl. No.: 09/152,543

[22] Filed: Sep. 14, 1998

[30] Foreign Application Priority Data

Sep. 19, 1997 [JP] Japan ................................ P09-254928

[51] Int. Cl.$^7$ ...................................................... G11B 5/54
[52] U.S. Cl. ...................................... 360/254.1; 360/255.6
[58] Field of Search .............................. 360/99.01, 99.02, 360/105, 254.1, 255.6

[56] References Cited

U.S. PATENT DOCUMENTS

| | | | |
|---|---|---|---|
| 5,103,360 | 4/1992 | Maeda | 360/105 |
| 5,204,793 | 4/1993 | Plonczak | 360/97.01 |
| 5,222,005 | 6/1993 | Inoue | 360/99.06 |
| 5,552,948 | 9/1996 | Yokota et al. | 360/105 |
| 5,644,554 | 7/1997 | Harada et al. | 369/13 |
| 5,726,832 | 3/1998 | Inagaki et al. | 360/105 |

*Primary Examiner*—Jefferson Evans
*Attorney, Agent, or Firm*—Limbach & Limbach LLP

[57] ABSTRACT

To prevent magnetic heads from being pasted on a floppy disk even when the floppy disk is left for a long time period while being chucked to a disk table, when the magnetic heads are moved to an outermost peripheral position or an innermost peripheral position of the floppy disk by a head moving mechanism, the upper side head is lifted upward from the floppy disk by a lifter.

4 Claims, 6 Drawing Sheets

DISK DRIVING APPARATUS WITH UPPER AND LOWER HEAD ARMS AND A SIMPLE HEAD DETACHING MEANS

BACKGROUND OF THE INVENTION

1. Field of the Invention

The present invention relates to a floppy disk apparatus for recording and reproducing a floppy disk having a diameter of, for example, 3.5 inch or the like.

2. Description of Related Art

Figure 1:
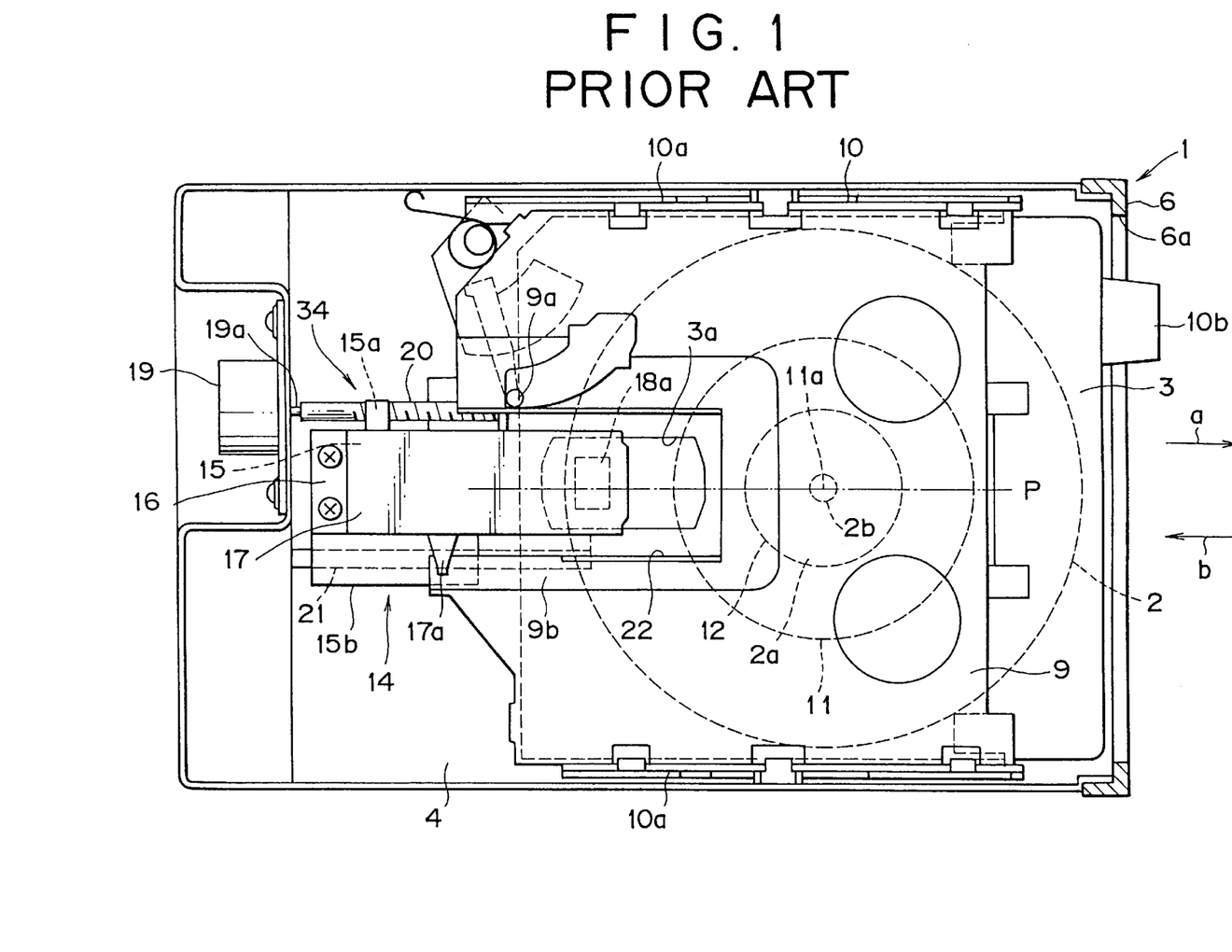
FIG. 1 is a plane view of a conventional floppy disk apparatus.
Figure 2:
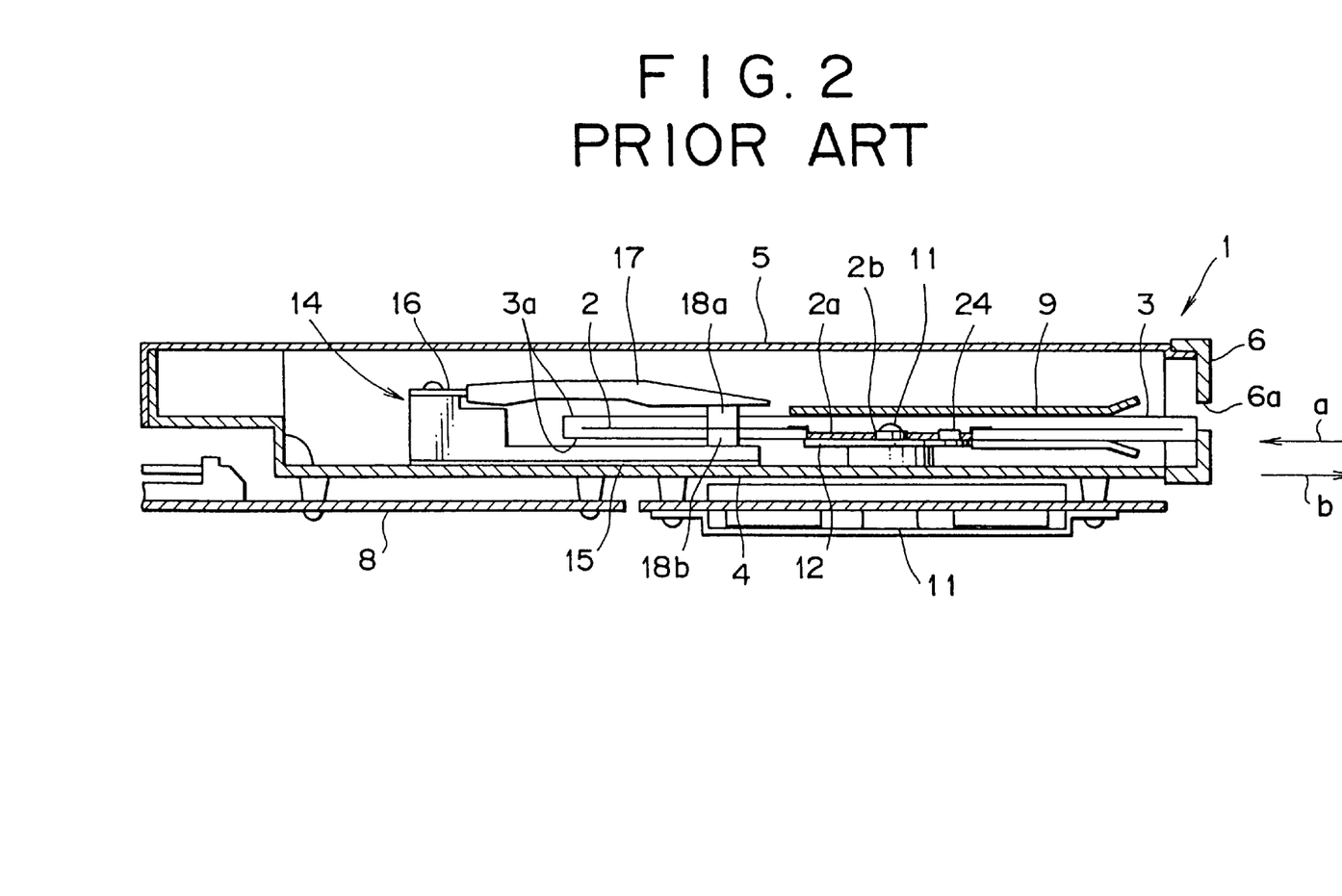
FIG. 2 is a side sectional view of FIG. 1.

As shown by FIG. 1 and FIG. 2, a floppy disk apparatus 1 is for recording and reproducing a floppy disk 2 comprising a magnetic disk having a diameter of 3.5 inch or the like and the floppy disk 2 is used by being contained rotatably in a flat disk cartridge 3. Further, the disk cartridge 3 is formed with a pair of upper and lower head insertion holes 3a and attached with shutters (not illustrated) for opening and closing the head insertion holes 3a.

Further, the floppy disk apparatus 1 is formed in a shape of a flat box by three exterior members of a chassis 4 formed by aluminum die casting or sheet drawing, a cover 5 formed by drawing a thin plate and attached above the chassis 4 and a front panel 6 formed by synthetic resin and attached to front ends of the chassis 4 and the cover 5. Further, a cartridge insertion port 6a is formed at the front panel 6 and a main printed substrate 7 is screwed to a lower face of the chassis 4.

Further, at inside of the floppy disk apparatus 1 and above the chassis 4, a cartridge holder 9 is arranged horizontally, and the cartridge holder 9 is attached above the chassis 4 such that the cartridge holder 9 is capable of freely elevating and lowering in the up and down direction by a parallel motion by a holder elevating and lowering mechanism 10 having slide plates 10a having a sectional shape of a substantially a channel-like shape and directed upwardly which is conventionally and publicly known. Further, a shutter opening and closing lever 9a is attached to a rear end of the cartridge holder 9 and an eject button 10b attached to front ends of the slide plates 10a is projected forward from the front panel 6.

Further, on a center line P at inside of the floppy disk apparatus 1 and at a lower position of the cartridge holder 9, a spindle motor 11 which is a direct current motor attached horizontally to the chassis 5 is arranged and a disk table 12 is horizontally fixed to an upper end of a vertical spindle 11a of the spindle motor 11. Further, at inside of the floppy disk apparatus 1 and at a rear position of the disk table 12, a head mechanism 14 attached on the chassis 4 is arranged.

The head mechanism 14 is constituted by a head carriage 15, a head arm 17 attached rotatably in the up and down direction via a leaf spring 16 or the like above the head carriage 15, a pair of upper and lower magnetic heads 18a and 18b attached opposedly in the up and down direction on upper and lower opposed faces at front ends of the head carriage 15 on the head arm 17 via cymbal plates (not illustrated), a stepping motor 19 which is a motor for moving the head, a horizontal lead screw 20 directly connected to a motor shaft 19a of the motor, a horizontal guide shaft 21 in parallel with the lead screw 20 and so on. Further, the pair of upper and lower magnetic heads 18a and 18b are arranged on the center line P which is on a radial line from the center of the floppy disk 2.

Further, a needle 15a formed at one side portion of the head carriage 15 is engaged with the lead screw 20, and a thrust bearing 15b integrally formed with other end portion of the head carriage 15 is inserted slidably on the outer periphery of the guiding shaft 21. Further, the magnetic head 18a on the upper side is inserted into a notch 22 formed at a central portion on a rear end side of the cartridge holder 9 and a guided projection 17a integrally formed with one side face of the head arm 17, is brought into slidable contact with a guide rail 9b formed at one side edge of the notch 22 of the cartridge holder 9. A head moving mechanism 34 is constituted by the stepping motor 19, the lead screw 20, the guide shaft 21 and so on mentioned above.

Further, according to the conventional floppy disk apparatus 1, when the disk cartridge 3 is horizontally inserted in an arrow mark "a" direction from the cartridge insertion port 6a into the cartridge holder 9, shutters of the disk cartridge 3 are opened by the shutter opening and closing lever 23 and the slide plates 10a of the holder elevating and lowering mechanism 10 are slid in an arrow mark "b" direction and the cartridge holder 9 is lowered in a horizontal state. Further, the disk cartridge 3 is lowered in a horizontal state, the floppy disk 2 at inside thereof is chucked to the spindle 11a and the disk table 12 from above by a center core 2a and the pair of upper and lower magnetic heads 18a and 18b are inserted from the pair of upper and lower head insertion holes 3a formed at the disk cartridge 3 into the disk cartridge 3 and are brought into light press contact with both upper and lower faces of the floppy disk 2. Further, in the state of chucking the floppy disk 2, the guide rail 9b of the cartridge holder 9 is lowered below the guided projection 17a of the head arm 17.

Further, the floppy disk 2 is driven to rotate by the spindle motor 11 and the head carriage 15 and the head arm 17 are integrally moved in the arrow mark "a" or "b" direction by the lead screw 20 driven to rotate by the stepping motor 19 while guiding the head carriage 15 by the guide shaft 21, by which the pair of upper and lower magnetic heads 18a and 18b are moved along the center line P in the arrow mark "a" or "b" direction and recording and reproducing of both upper and lower faces of the floppy disk 2 are carried out by the pair of upper and lower magnetic heads 18a and 18b.

Further, after recording or reproducing operation, when the eject button 10b is pushed in the arrow mark "a" direction, the slide plates 10a of the cartridge elevating and lowering mechanism 10 are slid in the arrow mark "a" direction and the cartridge holder 9 is elevated in a horizontal state. Further, the disk cartridge 3 is elevated in a horizontal state and the floppy disk 2 at inside thereof is detached upward from the spindle 111 and the disk table 12 and the pair of upper and lower magnetic heads 18a and 18b are detached upward and downward from the disk cartridge 3 and thereafter, the disk cartridge 3 is ejected in the arrow mark "b" direction from the cartridge insertion hole 7a of the front panel 7 by the shutter opening and closing lever 9a.

However, according to the conventional floppy disk apparatus 1, after carrying out recording or reproducing operation of the floppy disk 2, when the floppy disk 2 is left for a long period of time while being chucked on the disk table 12, the pair of upper and lower magnetic heads 18a and 18b are left for a long period of time while being brought into light press contact with both upper and lower faces of the floppy disk 12 and depending on environment of high temperature, high humidity or the like, the pair of upper and lower magnetic heads 18a and 18b may be pasted on both upper and lower faces of the floppy disk 2 as they are. Further, when the spindle motor 11 is unpreparedly started or the floppy disk 2 is unpreparedly ejected without knowing the pasted state of the pair of upper and lower magnetic heads 18a and 18b, support parts of cymbal plates or the like supporting the pair of upper and lower magnetic heads 18a and 18b or the floppy disk 2 per se are liable to destruct.

SUMMARY OF THE INVENTION

The present invention has been carried out in order to resolve the above-described problem and it is an object of the present invention to provide a floppy disk apparatus in which a pair of upper and lower magnetic heads are not pasted on both upper and lower faces of a floppy disk at all even when the floppy disk is left for a long period of time while being chucked to a disk table after recording or reproducing of the floppy disk has been carried out.

According to a first aspect of the present invention, there is provided a disk driving apparatus comprising:

a chassis;

rotating means installed at the chassis for rotating a disk-like record medium;

a head carriage installed movably in a diameter direction of the disk-like record medium;

a head arm portion installed pivotably to the head carriage;

a head portion installed to the head arm portion;

head moving means for moving the head portion by moving the head carriage relative to the chassis; and detaching means for detaching the head portion from the disk-like record medium by moving the head portion to a predetermined position by the head moving means.

According to a second aspect of the present invention, there is provided the disk driving apparatus according to the first aspect:

wherein the detaching means detaches the head portion from the disk-like record medium by moving the head portion to an innermost peripheral position or an outermost peripheral position of the disk-like record medium by the head moving means.

According to a third aspect of the present invention, there is provided the disk driving apparatus according to the first aspect:

wherein the detaching means comprises a guided portion installed at the head arm portion and a projected portion installed at the chassis for detaching the head arm portion from the disk-like record medium by being engaged with the guided portion when the head portion is disposed at the predetermined position.

According to a fourth aspect of the present invention, there is provided the disk driving apparatus according to the third aspect:

wherein the head arm portion comprises an upper side head arm and a lower side head arm;

wherein the head portion comprises an upper side head and a lower side head;

wherein the guided portion is installed at the upper side head arm; and wherein the head portion is detached from the disk-like record medium by making the guided portion ride on the projected portion.

According to a fifth aspect of the present invention, there is provided the disk driving apparatus according to the first aspect, further comprising:

a cartridge holder for holding the disk-like record medium.

According to a sixth aspect of the present invention, there is provided the disk driving apparatus according to the fifth aspect:

wherein the detaching means comprises a guided portion installed at the head arm portion and a projected portion installed at the cartridge holder for detaching the head portion from the disk-like record medium by being engaged with the guided portion when the head is disposed at the predetermined position.

According to a seventh aspect of the present invention, there is provided the disk driving apparatus according to the sixth aspect:

wherein the head arm portion comprises an upper side head arm and a lower side head arm;

wherein the head portion comprises an upper side head and a lower side head;

wherein the guided portion is installed at the upper side head arm; and wherein the head portion is detached from the disk-like record medium by making the guided portion ride on the projected portion.

According to an eighth aspect of the present invention, there is provided the disk driving apparatus according to the first aspect:

wherein the disk-like record medium is a floppy disk.

DETAILED DESCRIPTION OF THE PREFERRED EMBODIMENTS

An explanation will be given of embodiments of floppy disk apparatuses to which the present invention is applied in reference to FIG. 3 through FIG. 6 as follows.

Figure 3:
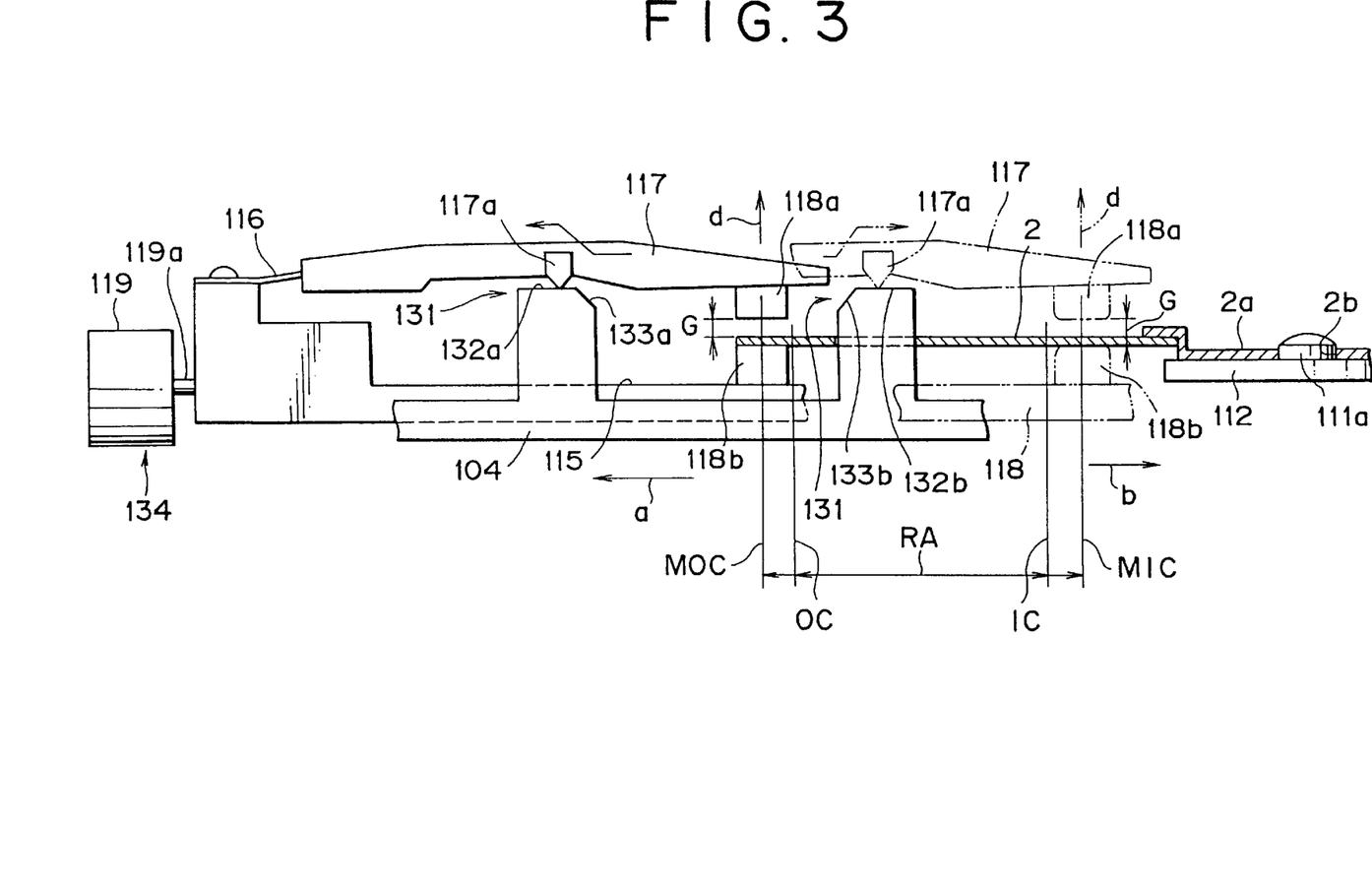
FIG. 3 is a partially cut side view showing a state in which an upper side magnetic head is lifted by a lifter according to a first embodiment of a floppy disk apparatus to which the present invention is applied.
Figure 4:
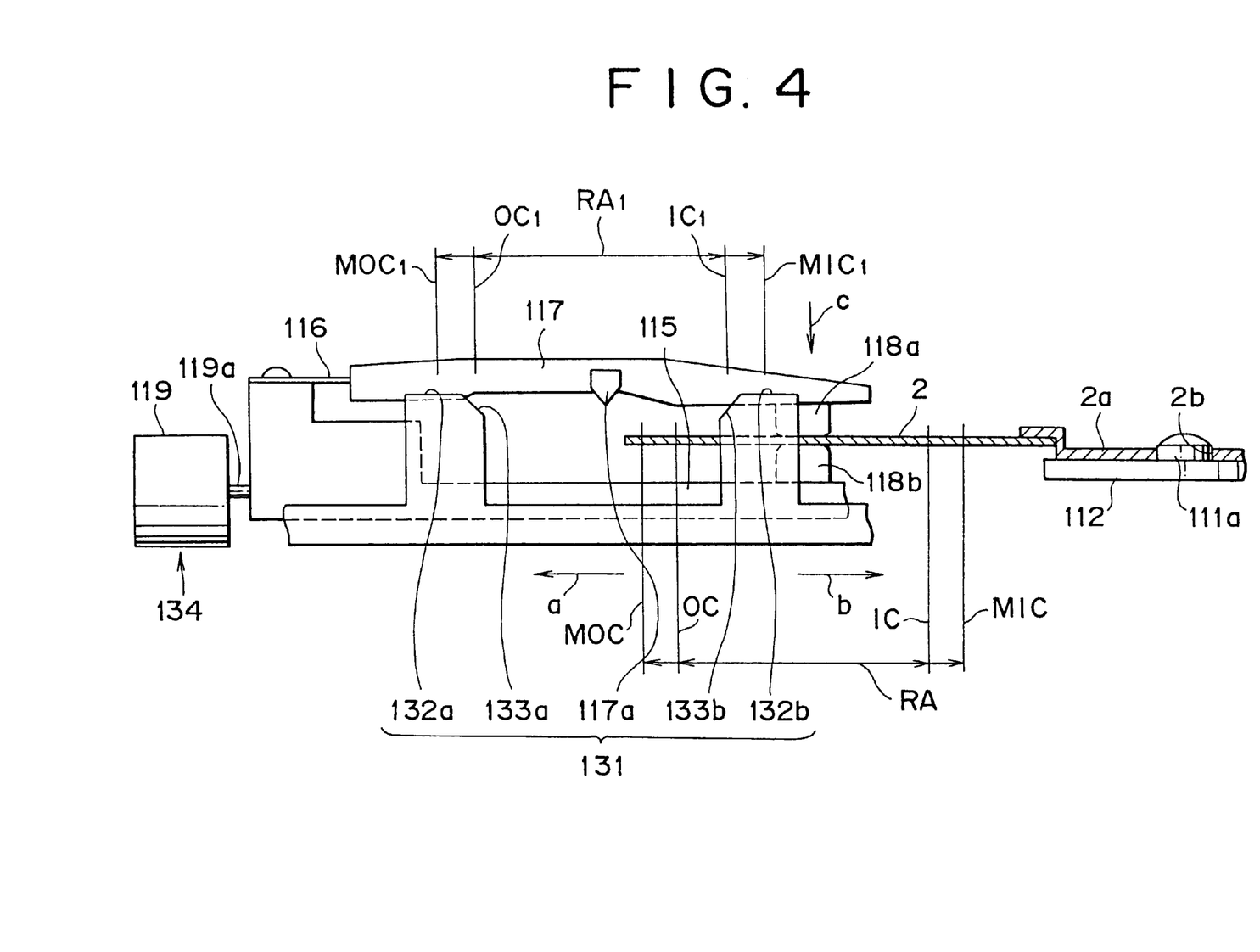
FIG. 4 is a partially cut side view showing a state in which a floppy disk is being recorded or reproduced according to the first embodiment of the present invention.

First, according to a first embodiment shown by FIG. 3 and FIG. 4, an outermost peripheral position MOC and an innermost peripheral position MOI are set on the outer sides of an outer periphery OC and an inner periphery IC of a data record area RA of the floppy disk 2 by the pair of upper and lower magnetic heads 18a and 18b. Further, positions of a guided projection 117a of a head arm 117 in correspondence with the above-described respective positions RA, OC, IC, MOC and MIC are respectively designated by notations RA$_1$, OC$_1$, IC1, MOC1 and MIC1 and a pair of projections for lifter 132a and 132b which are arranged at the outermost peripheral position MOC1 and the innermost peripheral position MIC, are formed at a chassis 104 of a floppy disk apparatus 101. Further, guide slope faces 133a and 133b for sliding to lift the guided projection 117a are formed on inner side edges of the both projections for lifter 132a and 132b. Further, a lifter 131 is constituted by the guided projection 117a and either of the projections for lifter 132a and 132b.

Further, according to the first embodiment, in normal recording and reproducing states, as shown by FIG. 4, the head arm 117 is urged to rotate by a leaf spring 116 or the like in an arrow mark "c" direction, that is, in the downward direction and the pair of upper and lower magnetic heads 118a and 118b are brought into light press contact with both upper and lower faces of the floppy disk 2. Further, while driving to rotate the floppy disk 2 by a disk table 112, the pair of upper and lower magnetic heads 118a and 118b are moved in the data record area RA in the arrow mark "a" or "b" direction by a head moving mechanism 134 and recording and reproducing of data are carried out in the data record area RA on both upper and lower faces of the floppy disk 2.

Further, according to the first embodiment, in the case where the floppy disk 2 is left for a constant time period or more while chucking the floppy disk 2 on the disk table 112, that is, when a state in which data is not recorded (written) has elapsed for a constant time period or more or when OFF signal of a spindle motor 111 is sent by a floppy disk controller in a state where the floppy disk 2 is being chucked, as a function of the floppy disk apparatus 101 per se, a stepping motor 119 of the head moving mechanism 134 is operated for a constant time period, a head carriage 115 and the head arm 117 are automatically fed in the arrow mark "a" direction or the arrow mark "b" direction, and the pair of upper and lower magnetic heads 118a and 118b are escaped to either of the outermost peripheral position MOC and the innermost peripheral position MIC which are disposed at the outer side positions of the outer periphery OC and the inner periphery IC of the data record area RA of the floppy disk 2.

Further, when the pair of upper and lower magnetic heads 118a and 118b are moved in the arrow mark "a" direction or the arrow mark "b" direction to the outermost peripheral position MOC or the innermost peripheral position MIC, as shown by FIG. 3 by bold lines and one-dotted chain lines, the guided projection 117a of the head arm 117 is slid to lift on the projection for lifter 132a or 132b via the guide slop 133a or 133b, the head arm 117 is lifted in an arrow mark "d" direction, that is, in the upward direction against the leaf spring 116 and the upper side magnetic head 118a is floated up upward from the floppy disk 2 by a gap G. Further, when the upper side magnetic head 118a is floated upward from the floppy disk 2, the pair of upper and lower magnetic heads 118a and 118b are prevented from being pasted on both upper and lower faces of the floppy disk 2. Accordingly, even when the floppy disk 2 is left for a long period of time while chucking the floppy disk 2 on the disk table 112, the pair of upper and lower magnetic heads 118a and 118b can beforehand be prevented from being pasted on both upper and lower faces of the floppy disk 2. Further, thereafter, when normal record mode is started, the pair of upper and lower magnetic heads 118a and 118b are moved in the arrow mark "b" direction of the arrow mark "a" direction from the outermost peripheral position MOC or the innermost peripheral position MIC of the floppy disk 2 to inside of the data record area RA, the guided projection 117a is slid to lower from the projection for lifter 132a or 132b via the guide slope 133a or 133b and moved to inside of the RA1 area a nd accordingly, the pair of upper and lower magnetic heads 118a and 118b are again brought into light press contact with both upper and lower faces of the floppy disk 2 by the leaf spring 116.

Figure 5:
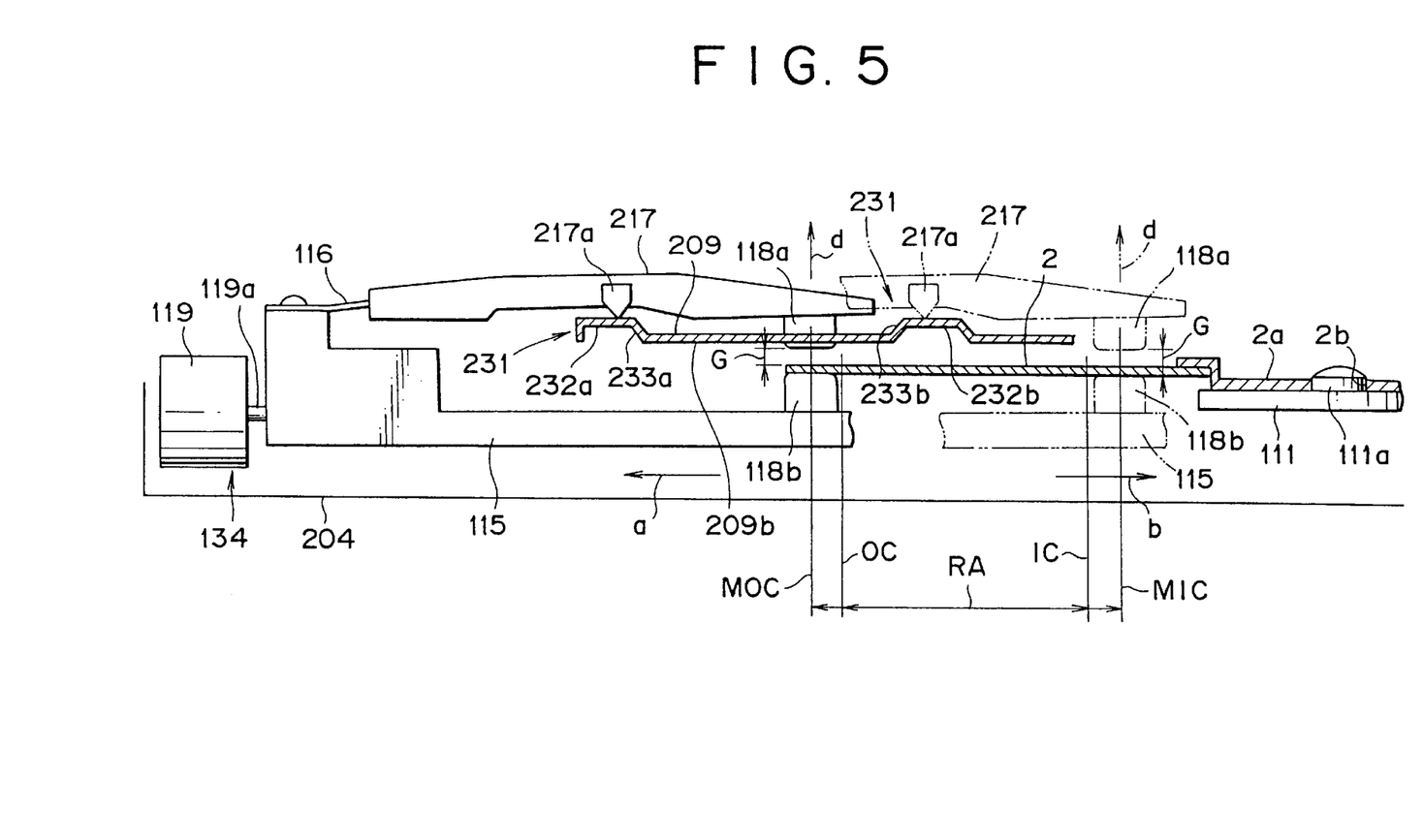
FIG. 5 is a partially cut side view showing a state in which an upper side magnetic head is lifted by a lifter according to a second embodiment of a floppy disk apparatus to which the present invention is applied.
Figure 6:
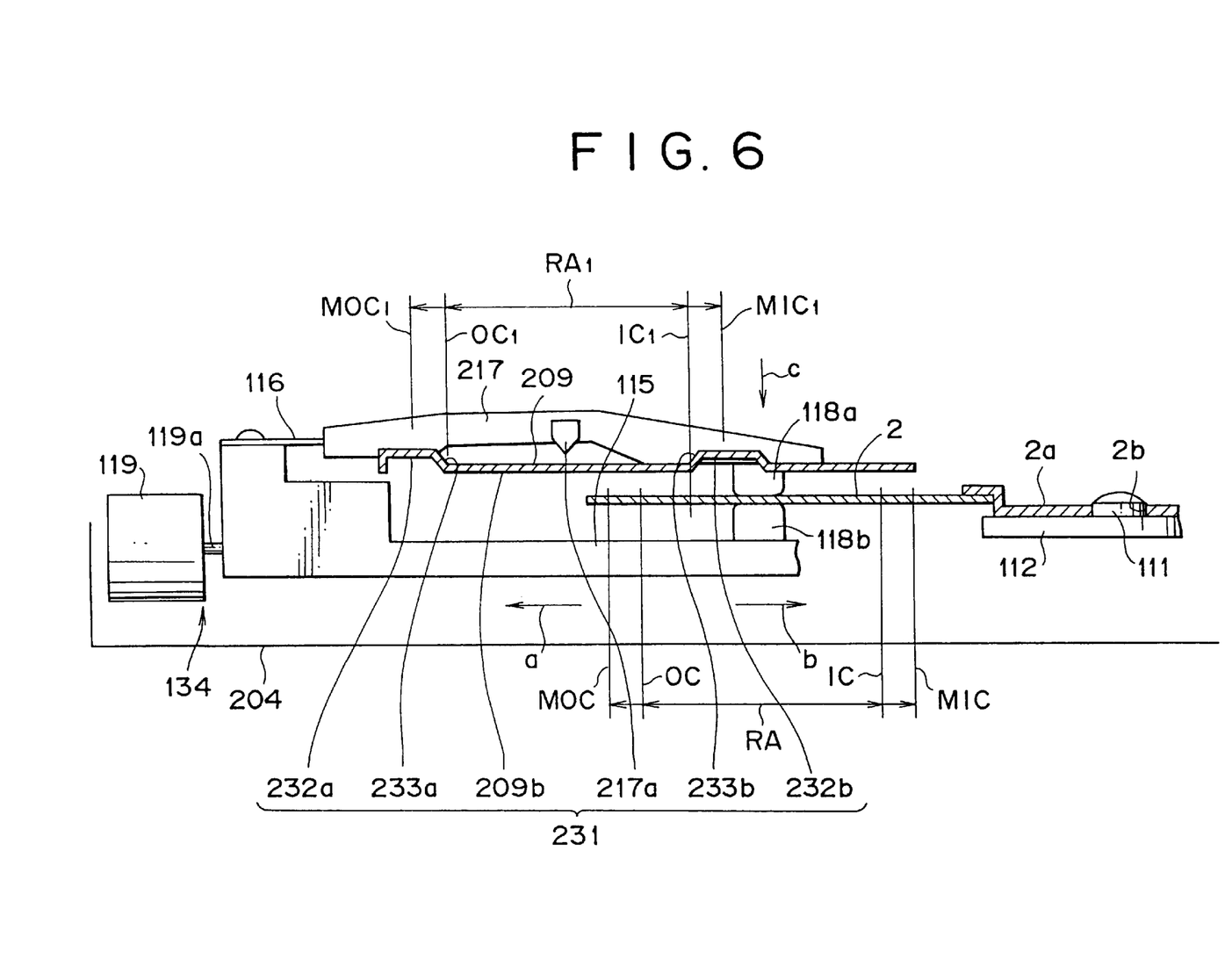
FIG. 6 is a partially cut side view showing a state in which a floppy disk is being recorded or reproduced according to the second embodiment of the present invention.

Next, according to a second embodiment shown by FIG. 5 and FIG. 6, pairs of projections for lifter 232a and 232b and guide slopes 233a and 233b constituting a lifter 231 which is movable relative to a chassis 204, are formed on a guide rail 209b of a cartridge holder 209, achieving a function quite similar to that in the first embodiment. Further, portions having structures the same as those in FIGS. 3 and 4 are attached with the same notations and a duplicated explanation will be omitted. Further, in the first and the second embodiments, a roller (bearing or the like) may be attached to the guided projection 117a or 217a, and load resistance in sliding to lift or lower the guided projection 117 or 217 on the projection for lifter 132a or 232a or 132b or 232b, may be reduced.

Although an explanation has been given of the embodiments of the present invention as described above, the present invention is not restricted to the above-described embodiments but can be modified variously on the basis of technical thought according to the present invention.

The disk driving apparatuses according to the present invention constituted as described above, achieve the following advantages.

According to the present invention, when the pair of upper and lower magnetic heads are moved to the outermost peripheral position or the innermost peripheral position of the floppy disk by the head moving mechanism, the upper side magnetic head is lifted upward from the floppy disk by the lifter and accordingly, even when a constant time period has elapsed under a state in which the floppy disk is being chucked by the disk table, in the case where recording or reproducing operation is not carried out, the pair of upper and lower magnetic heads are moved to the outermost peripheral position or he innermost peripheral position of the floppy disk by the head moving mechanism by which even when the floppy disk is left for a long period of time while being chucked to the disk table. The pair of upper and lower magnetic heads can be prevented from being pasted on both upper and lower faces of the floppy disk beforehand and a floppy disk apparatus having high safety and reliability can be realized.

Further, the lifter is constituted by the guided projection installed at the head arm and the projections for lifter installed at the chassis or the cartridge holder and accordingly, a floppy disk apparatus in which the structure is simple, the fabrication is facilitated and the cost is low can be realized.

What is claimed is:

1. A disk driving apparatus comprising:

a chassis;

rotating means installed at the chassis for rotating a disk-like record medium;

a head carriage installed movably in a diameter direction of the disk-like record medium;

a head arm portion installed pivotably to the head carriage, the head arm portion comprising an upper side head arm and a lower side head arm;

a head portion installed to the head arm portion, the head portion comprising an upper side head and a lower side head;

head moving means for moving the head portion by moving the head carriage relative to the chassis; and detaching means for detaching the head portion from the disk-like record medium by moving the head portion to an innermost peripheral position or an outermost peripheral position of the disk-like record medium by the head moving means, wherein the detaching means comprises a guided portion installed at the upper side head arm and a projected portion installed at the chassis for detaching the head arm portion from the disk-like record medium by making the guided portion ride on the projected portion.

2. The disk driving apparatus according to claim 1, further comprising a cartridge holder for holding the disk-like record medium.

3. The disk driving apparatus according to claim 1, wherein the disk-like record medium is a floppy disk.

4. A disk driving apparatus comprising, a chassis;

rotating means installed at the chassis for rotating a disk-like record medium;

a cartridge holder for holding the disk-like record medium;

a head carriage installed movably in a diameter direction of the disk-like record medium;

a head arm portion installed pivotably to the head carriage, the head arm portion comprising an upper side head arm and a lower side head arm;

a head portion installed to the head arm portion, the head portion comprising an upper side head and a lower side head;

head moving means for moving the head portion by moving the head carriage relative to the chassis; and detaching means for detaching the head portion from the disk-like record medium by moving the head portion to an innermost peripheral position or an outermost peripheral position of the disk-like record medium by the head moving means, wherein the detaching means comprises a guided portion installed at the upper side head arm and a projected portion installed at the cartridge holder for detaching the head portion from the disk-like record medium by being engaged with the guided portion.

* * * * *